Patented Apr. 12, 1949

2,466,799

UNITED STATES PATENT OFFICE 2,466,799

BLUEPRINT MARKING SOLUTION

John R. Fisher, Jr., Dayton, Ohio, assignor to The Commonwealth Engineering Company of Ohio, Dayton, Ohio, a corporation of Ohio No Drawing. Application May 31, 1946, Serial No. 673,604

2 Claims. (Cl. 106—26)

This invention deals with a method of marking blue prints and compositions therefor.

The manufacture of blue prints is based on the conversion of ferric ferricyanide, $Fe[Fe(CN)_6]$, to ferric ferrocyanide, $Fe_4[Fe(CN)_6]_3$, under the influence of light. The blue colored ferric ferrocyanide is water-insoluble; however, it may be dissolved and removed by alkali metal hydroxide, which on account of this property has been used for marking and retouching blue prints. A disadvantage of the use of alkali hydroxide for this purpose is that the white marks turn yellow after a short while, a feature which impairs the appearance of the blue prints.

It is an object of this invention to provide a method and compositions by which blue prints can be provided with white marks that do not turn yellow.

It is another object of this invention to provide compositions for marking blue prints that do not deteriorate during storage.

It is another object of this invention to provide a method and compositions for marking blue prints by which at the same time a protective film is applied on the marks produced so that after-yellowing is prevented.

It is still another object of this invention to provide compositions for marking blue prints which dry rapidly after application so that the marks produced retain their clean-cut outlines.

It is still another object of this invention to provide a method and compositions for producing marks on blue prints that cannot be erased.

These and other objects are accomplished by mixing an aqueous solution of alkali hydroxide and an alkali-compatible film-forming solution.

Sodium hydroxide as well as potassium hydroxide have been found suitable as the active ingredient of the product of my invention. As the film-forming compound any material that is compatible with the alkali hydroxide and water soluble, is operative. The best results were obtained with Cellosize which is a 10% solution of hydroxyethyl cellulose in water and which is sold by the Carbide and Carbon Chemicals Company. One example of a formula producing excellent results in blue print marking is the following:

| | |
|---|---|
| Cellosize | cc 40 |
| Water | cc 60 |
| Sodium hydroxide | gms 20 |

Sometimes it is advantageous to add a wetting agent to the mixture of my invention. Thus, for example, diglycol laurate has been found satisfactory for this purpose.

It will be understood that while there have been described herein certain embodiments of my invention, it is not intended thereby to have the invention limited to or circumscribed by the specific details given, since this invention is susceptible to various modifications and changes which come within the spirit of this disclosure and the scope of the appended claims.

I claim:

1. A blue print marking composition consisting essentially of about 40 parts by volume of a 10% aqueous solution of hydroxyethyl cellulose, about 60 parts by volume of water and about 20 parts by weight of sodium hydroxide.

2. A blue print marking composition consisting essentially of about 40 parts by volume of a 10% aqueous solution of hydroxyethyl cellulose, about 60 parts by volume of water and about 20 parts by weight of sodium hydroxide, and diglycol laurate as a wetting agent.

JOHN R. FISHER, Jr.

REFERENCES CITED

The following references are of record in the file of this patent:

UNITED STATES PATENTS

| Number | Name | Date |
|---|---|---|
| 1,941,276 | Schorger | Dec. 26, 1933 |
| 2,090,808 | Richter | Aug. 24, 1937 |
| 2,107,852 | Bolton | Feb. 8, 1938 |
| 2,234,252 | Homan | Mar. 11, 1941 |

OTHER REFERENCES

"Ferric and Heliographic Processes," Brown, 2d ed., pages 22 and 115.

"Uses and Applications of Chemical and Related Materials," Gregory (1939), vol. I, page 242.

"Chemicals Glyco," Glyco Products Co. Inc., 26 Court St., Brooklyn 2, N. Y. (1944), pages 25, 26, 27 and 29.